G. Sherwood,
School Seat.

No. 69,850.      Patented Oct. 15, 1867.

Witnesses:
E. J. Sherman
E. Hurt

Inventor:
Geo. Sherwood

N. PETERS, PHOTO-LITHOGRAPHER, WASHINGTON, D. C.

United States Patent Office.

GEORGE SHERWOOD, OF CHICAGO, ILLINOIS.

*Letters Patent No. 69,850, dated October 15, 1867.*

IMPROVED FOLDING SEAT.

*The Schedule referred to in these Letters Patent and making part of the same.*

TO ALL WHOM IT MAY CONCERN:

Be it known that I, GEORGE SHERWOOD, of Chicago, Cook county, Illinois, have invented certain new and useful improvements in Turn-Up Seats; and I do declare that the following is a full, clear, and exact description of the construction and operation of the same, reference being had to the accompanying drawings, which are made a part of this specification, in which—

Figure 1:
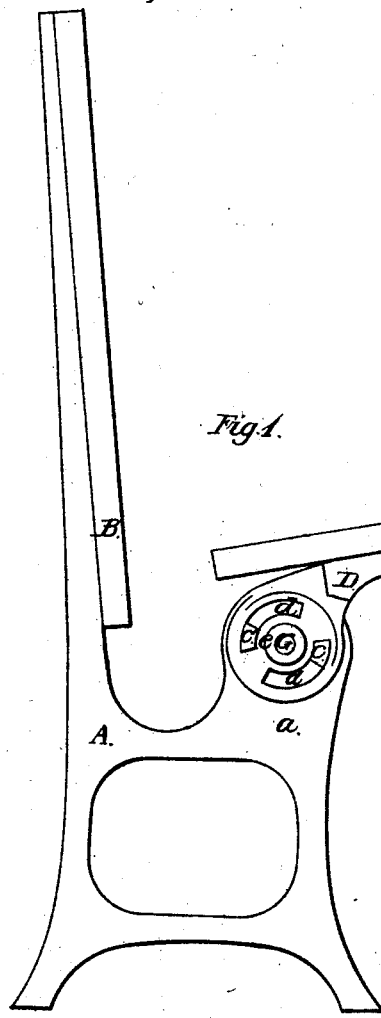
Figure 1 shows the inside of one of the cast standards, showing the connection or joint in use, and the seat in section.
Figure 3:
Figure 3 is an outside view of that part of the standard marked $a$.
Figure 2:
Figure 2 is a front view of the two parts of the joint when together.
Figure 4:
Figure 4 is an inside view of the same.
Figure 5:
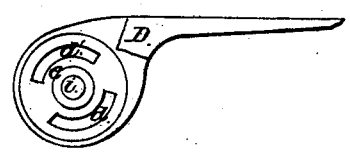
Figure 5 is a detached view of the arm D.

To enable others skilled in the art to make and use my invention, I proceed to describe its construction and operation.

The standards A are cast of any suitable form. On the inside of that part of the standard marked $a$ I cast a pivot, $b$, through which is a hole, $i$, to receive a screw or bolt to hold the two parts of the joint in place. On this part $a$ I also cast two projections $c$ $c'$, which support the arm D. This pivot $b$ and lugs $c$ $c'$ should project out. The arm D is to be of suitable length, and adapted to the seat C, and is provided with a hub, $e$, fitting the pivot $b$, and is also provided with two slots $d$ $d'$ to receive the lugs $c$ $c'$, and so arranged and placed that when the seat C is down the upper end of the slot $d$ strikes against the lug $c$, and the lower end of the slot $d'$ strikes against the lug $c'$. The lugs $c$ $c'$ are placed one on each side of the pivot $b$, and a little distance therefrom.

By this arrangement I have a joint for a turn-up seat much stronger than any now in use, there being two points of support at $c$ and $c'$. The short arm of the lever can be as long again as in other joints, and there is no strain on the pivot $b$, which in many joints is one of the principal points of support. The seat can be turned up whenever desired, and the slots and lugs may be so arranged that the seat C will not strike against the back B, the motion being arrested by the lugs. I hold the two parts of the joint together by means of a screw or bolt passing through the pivot $b$ and through the axle $e$, held by means of a nut. To make a nice finish, the end of the hub $e$ may be countersunk to receive the nut.

Having thus fully described my invention, I do not claim broadly the application of a slot and lug to a school-desk hinge; but what I claim as new, and desire to secure by Letters Patent, is—

The combination and arrangement of the lugs $c$ $c'$, slots $d$ $d'$, axle $b$, hub or cup $e$, and screw or nut $i$, with the standard $a$ and arm D, substantially as and for the purposes specified.

GEO. SHERWOOD.

Witnesses:
E. B. SHERMAN,
E. A. WEST.